United States Patent [19]

Danick et al.

[11] 4,275,189
[45] Jun. 23, 1981

[54] NEOPENTYL GLYCOL, TEREPHTHALATE, DICARBOXY ACID, TRIMELLITATE THERMOSETTING RESIN

[75] Inventors: Charles Danick, Plymouth; K. A. Pai Panandiker, Maple Grove, both of Minn.

[73] Assignee: Cargill, Incorporated, Minneapolis, Minn.

[21] Appl. No.: 125,533

[22] Filed: Feb. 28, 1980

[51] Int. Cl.$^3$ ............................................. C08G 63/12
[52] U.S. Cl. ................................... 528/296; 528/302; 528/309; 560/76; 525/437; 525/444
[58] Field of Search ....................... 528/296, 302, 309; 560/76; 525/437, 444

[56] References Cited

U.S. PATENT DOCUMENTS

| 4,024,111 | 5/1977 | Thomas et al. ................. 528/296 X |
| 4,124,570 | 11/1978 | Scheibelhoffer et al. ....... 528/296 X |

Primary Examiner—Lucille M. Phynes
Attorney, Agent, or Firm—Fitch, Even, Tabin, Flannery & Welsh

[57] ABSTRACT

The invention is directed to a polyester resin, and a method for making it, for use in a powder coating. The resin comprises on oligomer of neopentyl glycol or cyclohexane dimethanol and terephthalic acid, isophthalic acid or dimethyl terephthalate in a mole ratio between about 1.15 and about 1.50, the oligomer being reacted with trimellitic anhydride to provide a trimellitate with the mole ratio oligomer to trimellitate being in the range of between about 2.5 and 5.5. The trimellitate is reacted with a dicarboxylic anhydride or acid with the mole ratio of trimellitate to dicarboxylic anhydride or acid between about 1.5 and about 2.5. The polyester resin has an ICI viscosity at 200° C. between about 20 poises and about 60 poises, an acid value of less than 30, a hydroxyl value between about 20 and about 60, and an equivalent weight between about 935 and about 2800.

5 Claims, No Drawings

NEOPENTYL GLYCOL, TEREPHTHALATE, DICARBOXY ACID, TRIMELLITATE THERMOSETTING RESIN

BACKGROUND OF INVENTION

The present invention relates generally to an improved polyester for powder coating resin, and, more particularly, it relates to such a resin having improved coating and handling characteristics.

Various regulatory requirements have reduced the extent to which solvent based coatings can be used and have required the development of new kinds of coatings that do not affect the environment. However, the new resins for such coatings should have the characteristics of previously provided coatings so as to be impervious, smooth and glossy while having good resistance to weather conditions, abrasion and solvents. The resin should provide good flow characteristics, while having viscosity stability at high temperatures, have high reactivity with curing agents, and provide improved flexibility.

The prior art discloses a thermosetting resin in U.S. Pat. No. 4,124,570 having some of the desired properties. However, more viscosity stability would be desired than provided by the resin disclosed in the indicated patent; and increased flow characteristics, as well as improved flexibility are to be desired, beyond those provided by practicing the disclosure of this patent. At the same time, a thermosetting resin requiring reduced amounts of curing agent in the coating system is particularly desired.

SUMMARY OF INVENTION

The present invention provides a thermosetting resin which has a very stable viscosity at high temperatures of the order of 450° F. Further, the resin of the invention has superior flow characteristics in finished coatings. The thermosetting resin disclosed herein provides improved flexibility at greater than 2 mil film thickness in the finished coatings. In addition, the thermosetting powder coating resin system, and in this connection, the resin of the invention has excellent reactivity with blocked isocyanate curing agents thereby permitting lower baking temperatures.

An object of this invention is the provision of an improved polyester for powder coating resins.

A further object of the invention is to provide a thermosetting resin having stable melt viscosity characteristics at high temperatures of the order of 450° F.

An additional object of the invention is to provide a thermosetting resin having improved flow characteristics in finished coatings.

A still further object of the invention is to provide a thermosetting resin with improved flexibility characteristics in finished coatings.

A still further object of the invention is to provide a thermosetting resin with low hydroxyl value and high reactivity to permit lower amounts of curing agent.

Further objects and advantages of this invention will be apparent from the following description.

GENERAL DESCRIPTION OF THE INVENTION

In general, the thermosetting resin of the invention is provided by effecting three successive reactions which can be considered to occur in three stages. In Stage I, neopentyl glycol or cyclohexane dimethanol is reacted with terephthalic acid or isophthalic acid to provide a neopentyl or cyclohexane terephthalate or isophthalate. Dimethyl terephthalate can be used in place of the acid, but its use is desirably avoided so as to omit the need for vacuum conditions in the process to strip off alcohol. The mole ratio of neopentyl gylcol or cyclohexane dimethanol to terephthalic acid or dimethyl terephthalate should be in the range of between about 1.15 and about 1.50.

The terephthalate or isophthalate from Stage I is in the form of a neopentyl glycol or cyclohexane dimethanol terephthalic acid oligomer which is then reacted in in Stage II with trimellitic anhydride or acid to provide a neopentyl or cyclohexane-terephthalate or isophthalate-trimellitate. The mole ratio of the neopentyl or cyclohexane terephthalate or isophthlate to the trimellitic anhydride or acid is in the range of between about 2.5 and about 5.5.

In Stage III, the neopentyl or cyclohexane terephthalate or isophthalate-trimellitate from Stage II is preferably reacted with succinic anhydride or acid. Other dibasic acids or anhydrides may be used and, in this connection, various commercial mixtures of dicarboxylic acids can be used. The mole ratio of neopentyl or cyclohexane terephthalate or isophthalate-trimellitate to the dicarboxylic anhydride or acid is in the range of between about 1.5 and about 2.5. The amount of dicarboxylic acid or anhydride is adjusted so that the viscosity stalls at an acid value in the range of 8–30 but preferably in the range of 8–15, and a hydroxyl value in the range of 20–60 is provided.

The product of the invention should have an ICI viscosity at 200° C. between about 20 poises and about 60 poises, but preferably between about 20 poises and about 45 poises and should have an acid value of less than 30. The equivalent weight of the product of the invention should be in the range of from about 935 to about 2800. The product, when crosslinked with blocked isocyanate curing agents, assures superior flow, high gloss, flexibility and lower baking temperature requirements for powder coatings. In order to obtain this product, the reaction stages should be carried out in the above indicated order.

To more particularly describe the process of the invention, the neopentyl glycol or cyclohexane dimethanol is charged into a vessel and, if not in liquid condition, it should be melted. A portion of the terephthalic acid or isophthalic acid is normally added to the liquid neopentyl glycol or cyclohexane dimethanol and, in this connection, the portion should be between 25% and 75% of the total terephthalic acid which is to be added. With some equipment, all of the terephthalic acid or isophthalic acid may be added. At the time that the portion of terephthalic acid or isophthalic acid is added, it is desired to add an esterification catalyst and a color stabilizer. Dibutyl tin oxide or butylchloro tin dihydroxide can be added in an amount of between about 0.025% and about 0.100% of the total weight of the charge as the esterification catalyst. In addition to the catalyst there can be added between about 0.2% and about 1% of the total charge weight, triphenyl phosphite or distearyl pentaerythritol diphosphite which function as color stabilizers.

The neopentyl glycol or cyclohexane dimethanol and the terephthalic acid or isophthalic acid are then heated to reaction temperature which is between about 370° F. and 450° F. Water from the reaction is collected and is monitored to determine the refractive index in accordance with well-known procedures. The principal purpose of monitoring the refractive index is to determine the loss of neopentyl glycol or cyclohexane dimethanol so that any loss can be made up in the reaction. Preferably, the reaction is controlled to minimize loss of neopentyl glycol or cyclohexane dimethanol.

After between about 35% and 40% of the water off has been collected, the charge is cooled to about 350° F. and the remaining terephthalic acid or isophthalic acid is added to the vessel. The mixture is heated to reaction temperature and reaction is continued until the charge is clear and the product has an ICI viscosity at 150° C. of between about 5.0 poises to about 20 poises, and an acid value preferably below about 10.

When the indicated conditions have been obtained, the product is cooled to about 350° F. and the trimellitic anhydride or acid is added to the product, whereupon the reaction mixture is heated to 450° F. The reaction is monitored by measuring the ICI viscosity at 175° C. and the acid value. When the ICI viscosity is the range of between about 5.0 poises and about 20 poises and when the acid value is less than 10, the reaction product is cooled to 350° F.–400° F. and the dicarboxylic acid or its anhydride, or mixtures thereof, are added to the vessel. The mixture is heated to 450° F.–500° F. to effect esterification.

The reaction is again monitored for ICI viscosity at 200° C.; and the acid value is measured. When the ICI viscosity is between 20 poises and 60 poises, and the acid value is less than 30, the viscosity will level off or stall, at which point the product is cooled. It can be flaked or otherwise processed for use in the powder coatings.

It is important that the trimelitic acid and dicarboxylic acid or anhydride be added sequentially, and it has been found that simultaneous addition of these compounds does not achieve the polyester of the invention. However, trimellitic acid or anhydride can be added, in part, after reaction with the dicarboxylic acid or anhydride, and the dicarboxylic acid or anhydride may be added in portions.

The ICI viscosities are determined by the method generally described in the *Journal For The Oil Chemists Society* (1970) Volume 53, pages 876-883 and the method particularly described on page 881.

EXAMPLE I

As a specific example of the invention, 1,688.4 grams of neopentyl glycol was weighed out and charged into a vessel. The neopentyl glycol was heated to about 285° F. in order to effect melting. Next, 1027.5 grams of terephthalic acid was added to the vessel along with 12.05 grams of triphenyl phosphite and 2.00 grams of dibutyl tin oxide. The vessel was heated to about 400° F. and the refractive index was monitored on the water being driven off from the vessel. Less than 6% of neopentyl glycol was in the water driven off during reaction. After about 160 grams of water off was accumulated, the vessel was cooled to about 350° F. and an additional 1027.5 grams of terephthalic acid was added.

The vessel was again heated up to about 400° F. and the reaction was observed and carried out until clarity was obtained. During this period, the reaction temperature rose to about 450° F. This took about 16 hours. The ICI viscosity at 150° C. was determined and found to be about 8 poise, and the acid value was measured and found to be about 5.

The product was cooled to about 350° F. and trimellitic anhydride was added in the amount of 153.6 grams. The product was monitored by determining the ICI viscosity at 175° C.

The product was heated gradually to 450° F. and the esterification reaction continued until the viscosity reached about 12.5 poises and an acid value of 7.5 was obtained whereupon the product was cooled to about 380° F. and 120 grams of succinic anhydride was added to the vessel. The product was then heated to 450° F. plus or minus 15° F. and the ICI viscosity was monitored at 200° C. After heating for 4 hours the viscosity was 12.5 poises and the product had an acid value of 12.6. 20 Grams additional trimellitic acid was added and the reaction continued until the viscosity stalled at 37 poises with an acid value of 8.4. The equivalent weight was 1769 and the hydroxyl value was 31.7.

The product, when cross-linked with blocked isocyanate curing agents exhibited superior flow, gloss, flexibility and an ability to bake at lower temperatures.

EXAMPLES II

In this Example, 1,688.4 grams of neopentyl glycol was weighed out and charged into a vessel. The charge was heated to 285° F. in order to melt the neopentyl glycol and cooled to 255° F., whereupon 1,027.9 grams of terephthalic acid was added to the charge. The mixture was stirred and heated to about 400° F.–420° F., and after 120 milliliters of water had been collected, 806 grams of butylchloro tin dihydroxide (available on the market as Fascat 4101) was added as an esterification catalyst. When 150 milliliters of water was collected, the product was cooled to 350° F. and 1028 grams of terephthalic acid was added and the mixture heated to 380° F. and held until 160 milliliters of water was collected. The mixture then was heated to 435° F. until 250 milliliters water was collected which had a refractive index of 1.3355. The vessel was heated to about 460° F. and 690 milliliters of water collected. The temperature was increased to 470° F. and held until 1395 milliliters of water was collected. The ICI value at 150° C. was 11.5 poises and the acid value was 1.4.

At 365° F., 173.4 grams trimellitic anhydride was added and the mixture heated to 460° F.–470° F., and the viscosity and acid value were monitored. When the viscosity showed an ICI value at 175° C. of about 12.0 poises and the acid value was 7.5, the product was cooled.

At 320° F., 115 grams of succinic anhydride was added and the mixture heated to 425° F. After 2 hours, the temperature was raised to 450° F. and when the product had an ICI viscosity at 200° C. of 26 poises the temperature was again raised to 460° F. When the product had an ICI viscosity of about 40 poises, the viscosity stalled and the batch was dropped from the vessel.

The product was an excellent polyester for making a powder coating resin.

EXAMPLE III

For this Example, 84.2 pounds of neopentyl glycol was added to a vessel and heated to about 310° F. to melt it, whereupon 50 pounds of terephthalic acid (commercially available as TA-33) was added with 46 grams of dibutyl tin oxide, as an esterification catalyst, and 183 grams of distearyl pentaerythritol diphosphite, as a color stabilizer. The mixture was heated to about 390° F. and the first water over occurred in about 30 minutes. Refluxing was carried out in the range of 390°

F.–405° F. and the refractive index monitored to check loss of neopentyl glycol. The refractive index was about 1.3348 representing a glycol content in the water collected of about 1.3 percent. After collecting about 2850 grams of water, the product was cooled to about 350° F. and 52.8 pounds more of the terephthalic acid was added. The mixture was heated to 405° F. and then gradually heated to 470° F. After the water collected during reaction totalled 9225 grams, the product was cooled to about 380° F. 8.7 pounds of trimellitic anhydride was added and the mixture heated to 450° F. While at temperature, the viscosity and acid value were monitored. When the ICI viscosity at 175° C. was 11.8 poises and the acid value was 7.7, the product was cooled to 380° F. for addition of 3.55 pounds more of succinic anhydride. The mixture was heated to 465° F. and after about three hours and twenty minutes 2.20 pounds of succinic anhydride was added. The mixture was gradually heated to 500° F. and the viscosity and acid value were monitored. The viscosity stalled at about 30 poises whereupon the product was filtered at 490° F.

The final product had an ICI viscosity at 200° C. of 34.8 poises, an acid value of 10.56, and a hydroxyl value of 36.4. The equivalent weight was 1541. The product was very soluble in methyl ethyl ketone. The polyester was an excellent ingredient for a powder coating resin.

EXAMPLE IV

The ingredients and amounts thereof were like those of Example III. The procedure of Example III was followed except that the esterification reaction proceeded until 9805 milliliters of water had been recovered and the succinic anhydride was charged at one time by the addition of 5.75 pounds. The final product had an ICI viscosity at 200° C. of 32 poises, an acid value of 9.65, and a hydroxyl value of 37.5. The product functioned with high performance in powder coating resins.

EXAMPLE V–X

In order to illustrate various other compositions which may be used in accordance with the invention, the following compositions, expressed in mole concentrations, were utilized in the procedure of the invention:

| COMPOSITIONS (moles) | | | | |
|---|---|---|---|---|
| V | NPG (13.8) | DMT (10.7) | TMA (1.0) | SA (1.2) |
| VI | NPG (16.2) | TA (12.4) | TMA (.9) | PA (1.1) |
| VII | NPG (16.2) | TA (12.4) | TMA (.9) | MA (1.1) |
| VIII | NPG (16.2) | TA (12.4) | TMA (.9) | Dibasic Acids (1.1) |
| IX | NPG (9.8) CHDM (6.5) | IPA (12.4) | TMA (.9) | SA (1.1) |
| X | CHDM (16.2) | IPA (12.4) | TMA (.9) | SA (1.1) |

NPG - neopentyl glycol
SA - succinic acid
CHDM - cyclohexane dimethanol
PA - phthalic anhydride
DMT - dimethyl terephthalate
MA - maleic anhydride
TA - terephthalic acid
IPA - isophthalic acid
TMA - trimellitic anhydride Example VII illustrates that maleic anhydride may be utilized in place of the succinic anhydride and Example VI illustrates that phthalic anhydride may be used in place of the succinic anhydride. In addition, Example VIII includes the use of a mixture of dibasic acids, comprising primarily $C_{12}$ and $C_{11}$ acids, as an alternative to succinic anhydride.

Other glycols may be used and Examples IX and X illustrate the use of cyclohexane dimethanol in the practice of the invention.

Example IX also illustrates that isophthalic can be incorporated in the manufacture of the product of the invention in place of terephthalic acid.

Example V demonstrates that dimethyl terephthalate may replace terephthalic acid in the manufacture of the product of the invention.

The products resulting from the use of the compositions indicated above had the following properties:

| | Acid Value | Hydroxyl Value | Equivalent Weight | ICI Viscosity (200° C.) poises |
|---|---|---|---|---|
| II | 26.7 | — | — | 34.3 |
| III | 19.7 | 39.3 | 1427 | 37.0 |
| IV | 14.9 | 35.1 | 1598 | 32.5 |
| V | 17.7 | 34.5 | 1626 | 57.5 |
| VI | 6.4 | 42.3 | 1326 | 35.6 |
| VII | 2.3 | 45.8 | 1225 | 30.0 |

Each of the products, cross-linked with blocked isocyanate curing agents exhibit gloss, and ability to bake at lower temperatures. Further each of the products had high temperature viscosity stability.

Various features of the invention which are believed to be new are set forth in the following claims:

We claim:

1. A polyester resin for a powder coating resin comprising an oligomer of neopentyl glycol or cyclohexane dimethanol and terephthalic acid, or isophthalic acid or dimethyl terephthalate in a mole ratio of between about 1.15 and about 1.50 reacted with trimellitic anhydride to provide a trimellitate, the mole ratio of the oligomer to the trimellitic anhydride being in the range from about 2.5 to about 5.5, the trimellitate being reacted with a dicarboxylic anhydride or acid in the mole ratio of between about 1.5 and 2.5; the polyester resin having an ICI viscosity at 200° C. between about 20 poises and about 60 poises, an acid value of less than 30, a hydroxyl value between about 20 and about 60, and an equivalent weight between about 935 and about 2800.

2. The product of claim 1 wherein the dicarboxylic acid or anhydride is succinic anhydride.

3. The product of claim 2 wherein the ICI viscosity is between about 20 poises and 45 poises and the acid value is less than 15.

4. A method for making a polyester resin comprising the steps of reacting neopentyl glycol or cycloxexane dimethanol with terephthalic acid, or isophthalic acid or dimethyl terephthalate in a mole ratio of between about 1.15 and about 1.50 to form an oligomer; reacting the oligomer with trimellitic anhydride in a mole ratio of between about 2.5 and about 5.5 to form a terephthalate trimellitate or isophthalate trimellitate; and then reacting the terephthalate trimellitate or isophthalate trimellitate with a dicarboxylic anhydride or acid in a mole ratio of between about 1.5 and 2.5, and terminating the reaction when the ICI viscosity at 200° C. stalls.

5. The method of claim 4 wherein the dicarboxylic anhydride or acid is succinic anhydride.

* * * * *